(12) United States Patent  
Ancin et al.

(10) Patent No.: US 8,244,767 B2  
(45) Date of Patent: Aug. 14, 2012

(54) COMPOSITE LOCALITY SENSITIVE HASH BASED PROCESSING OF DOCUMENTS

(75) Inventors: Hakan Ancin, San Jose, CA (US); Rajashekhar Goli, Sunnyvale, CA (US); Ankita Bakshi, Mountain View, CA (US); Kumar Maddali, Santa Clara, CA (US); Joy Thomas, Sunnyvale, CA (US); Karthik Ramachandran, Sunnyvale, CA (US)

(73) Assignee: Stratify, Inc., Mountain View, CA (US)

( * ) Notice: Subject to any disclaimer, the term of this patent is extended or adjusted under 35 U.S.C. 154(b) by 244 days.

(21) Appl. No.: 12/785,113

(22) Filed: May 21, 2010

(65) Prior Publication Data

US 2011/0087669 A1    Apr. 14, 2011

Related U.S. Application Data

(60) Provisional application No. 61/250,135, filed on Oct. 9, 2009, provisional application No. 61/300,382, filed on Feb. 1, 2010.

(51) Int. Cl.  
*G06F 17/30* (2006.01)

(52) U.S. Cl. ......... 707/791; 707/802; 707/822; 707/828

(58) Field of Classification Search ........... 707/600–831  
See application file for complete search history.

(56) References Cited

U.S. PATENT DOCUMENTS

| | | | |
|---|---|---|---|
| 6,240,409 B1 * | 5/2001 | Aiken | ................................. 1/1 |
| 6,745,205 B2 | 6/2004 | Choi | |
| 6,757,675 B2 | 6/2004 | Aiken | |
| 6,785,669 B1 | 8/2004 | Aggarwal | |
| 6,990,628 B1 | 1/2006 | Palmer | |
| 7,158,961 B1 | 1/2007 | Charikar | |
| 7,353,224 B2 | 4/2008 | Chen | |
| 7,433,869 B2 | 10/2008 | Gollapudi | |
| 7,574,449 B2 | 8/2009 | Majumder | |
| 2003/0061025 A1 | 3/2003 | Abir | |
| 2005/0060643 A1 | 3/2005 | Glass | |
| 2006/0095521 A1 | 5/2006 | Patinkin | |
| 2007/0038659 A1 | 2/2007 | Datar | |
| 2007/0083492 A1 | 4/2007 | Hohimer | |

(Continued)

FOREIGN PATENT DOCUMENTS

WO    WO 00/33215 A1    6/2000  
WO    WO 2008/009991 A1    1/2008

OTHER PUBLICATIONS

Andoni, Alexandr et al.; "Near-Optimal hashing algorithms for approximate nearest neighbors"; 2008, Communications of the ACM, vol. 51, No. 1, pp. 117-122.

(Continued)

*Primary Examiner* — Isaac M Woo (57) ABSTRACT

Reliable identification of highly similar documents allows such documents to be treated as identical for purposes of document analysis. Identification of highly similar documents can be based on a composite hash value or other value for which the likelihood of two documents having the same value is high if and only if the documents have a high degree of similarity. Prior to performing content based analysis, the composite hash value for the current document is determined and compared to composite hash values of previously analyzed documents. If a match is found, the results of the analysis of the previous document can be applied to the current document. If no match is found, the current document is analyzed.

20 Claims, 5 Drawing Sheets

U.S. PATENT DOCUMENTS

| | | |
|---|---|---|
| 2007/0136243 A1 | 6/2007 | Schorn |
| 2008/0082531 A1 | 4/2008 | Suarez |
| 2008/0133496 A1 | 6/2008 | Kanungo |
| 2008/0183693 A1 | 7/2008 | Arasu |
| 2008/0205774 A1 | 8/2008 | Brinker |
| 2008/0205775 A1 | 8/2008 | Brinker |
| 2009/0198677 A1 | 8/2009 | Sheehy |
| 2009/0216755 A1 | 8/2009 | Itamar |

OTHER PUBLICATIONS

Gionis, Aristides et al.; "Similarity Search in High Dimension via Hashing"; 1999, Proceedings of the 25$^{th}$ VLDB Conference, Edinburgh Scotland, 12 pages.

Ravichandran, Deepak et al.; "Randomized Algorithms and NLP: Using Locality Sensitive Hash Function for High Speed Noun Clustering"; 2005, *Proceedings of the 43$^{rd}$ Meeting of the ACL*, pp. 622-629.

Salakhutdinov, Ruslan et al.; "Semantic Hashing"; 2009, *International Journal of Approximate Reasoning*, vol. 50, pp. 969-978.

Stein, Benno et al.; "Applying Hash-based Indexing in Text-based Information Retrieval"; 2007, *Faculty of Media, Media Systems*, 7 pages.

\* cited by examiner

COMPOSITE LOCALITY SENSITIVE HASH BASED PROCESSING OF DOCUMENTS

CROSS-REFERENCES TO RELATED APPLICATIONS

This application claims the benefit of U.S. Provisional Patent Application No. 61/250,135, filed Oct. 9, 2009, entitled "Clustering of Near-Duplicate Documents," and also claims the benefit of U.S. Provisional Application No. 61/300,382, filed Feb. 1, 2010, entitled "Composite Locality Sensitive Hash Based Processing of Documents." The respective disclosures of both provisional applications are incorporated by reference herein in their entirety.

BACKGROUND

The present disclosure relates generally to automated document analysis and in particular to composite locality sensitive hash based processing of documents.

With the proliferation of computing devices and communication networks such as the Internet, an ever increasing amount of information is stored in the form of electronic documents. Such documents might be generated using application software such as word processing programs, e-mail programs, web page development tools, etc. Electronic documents can also be generated by scanning paper documents and employing optical character recognition ("OCR") or other techniques to create an electronic representation of the content.

It is often necessary to search through a large collection of electronic documents to find information relevant to a particular question. For example, a number of search services provide interfaces via which users can search electronic documents that are accessible via the World Wide Web. In another context, discovery in civil litigation usually involves the production of massive quantities of electronic documents that the producing and receiving parties must sift through.

To facilitate review of a large corpus of documents, a number of analysis techniques have been developed that automatically determine properties of the document, e.g., by analyzing the patterns of occurrence of words. For example, semantic clustering attempts to group documents pertaining to the same topic, generally based on identifying words or combinations of words that tend to occur in documents within the cluster but not in documents outside the cluster. Automated language identification attempts to determine, e.g., from character sets or character sequences, what language a particular document is in.

Often, a large collection of documents will include multiple documents that are very similar or even identical to each other. For example, in the context of electronic document discovery, a party may produce multiple drafts of a contract whose terms were being negotiated. The drafts will often be largely identical in content, but the wording in sections under discussion will vary from one draft to the next. As another example, multiple e-mail messages from the same discussion thread (including e.g., replies and/or forwarded e-mails) may be identical except for the addition of a few words and changes in the message headers from one message to the next. As another example, in the context of the World Wide Web, several pages on different sites may copy the same content from a single source (e.g., a public-domain source), and the pages may differ only in ancillary features such as layout, titles, lists of related links, etc. A considerable amount of time can be spent analyzing such documents.

SUMMARY

Some existing systems for analyzing a large corpus of documents provide for "deduplication" at an early stage of processing. Deduplication processes generally attempt to identify documents that are identical to each other so that the same document need not be processed twice.

However, existing deduplication techniques focus on identical documents and do not consider the case where two documents, although not identical, are very similar to each other. Such documents are generally analyzed separately. This slows processing and can lead to inconsistent results, such as cases where documents that are in fact highly similar to each other are assigned to different semantic clusters due to edge effects of clustering algorithms or migration of cluster definitions as documents are added.

Certain embodiments of the present invention relate to techniques that can be used to reliably identify highly similar (including identical) documents, which are then treated as identical for purposes of document analysis. Identification of highly similar documents can be based on a composite hash value, a single scalar value representing content of the document and constructed in such a way that the likelihood of two documents having the same composite hash value is high if and only if the documents have a very high degree of similarity in their content (e.g., using the same words with the same frequency). Prior to performing content-based analysis, such as semantic clustering or language identification, on a current document, the composite hash value for the current document is determined and compared to composite hash values of previously analyzed documents. If a match is found, the results of the analysis of the previous document (which may include, e.g., analytic metadata such as a language or cluster identifier associated with the document) can be applied to the current document. If no match is found, the current document is analyzed.

One aspect of the invention relates to methods of analyzing documents belonging to a corpus. A composite hash value is computed for a current document from the corpus. A determination is made as to whether a previous document having the same composite hash value as the current document has been analyzed. If not, then the current document is analyzed, thereby determining one or more items of analytic metadata to be associated with the current document. Any type of content-based analysis may be performed, including but not limited to language determination, near-duplicate detection, and semantic clustering (or categorization). If a previous document having the same composite hash value as the current document has already been analyzed, then the current document is simply associated with one or more items of analytic metadata determined from analyzing the previous document, thus speeding up the analysis process. In either case, a representation of the association between the one or more items of analytic metadata and the current document can be stored.

A variety of locality sensitive or composite hash functions can be used to compute hash values. In some embodiments, a document is transformed to a content vector having some number of components, e.g., corresponding to various terms (words and/or phrases) that may occur in the document. The content vector components can reflect the number of occurrences of the various terms, and in some embodiments, each component can be weighted, e.g., based on term frequency statistics computed over the entire document corpus. Some number (N) of subsets of components of the content vector is defined, and for each such subset, a hash vector component is computed by applying a hash function to that subset of the components of the content vector. A hash function is applied to the N hash vector components to produce a composite hash value.

In some embodiments, composite hash values can also be used to organize the document information data store. For example, the composite hash value can be treated as a number of groups of digits (e.g., four groups of 8 bits each for a 32-bit composite hash value). A folder hierarchy can be defined, with a different group of digits associated with each level, and the folders at a given level corresponding to different values for that group of digits. The documents can be stored at the lowest level of the hierarchy, within a folder corresponding to their composite hash. In other embodiments, references to document storage locations can be stored in the folders. A similar hierarchical structure can be used to store the analytic metadata within a relational database.

Another aspect of the invention relates to computer-readable storage media containing program instructions that, when executed by a computer system, cause the computer system to execute a method of analyzing documents from a corpus of documents. For example, the computer system can select a current document from the corpus and compute a composite hash value for the current document. The system can determine whether a previous document having the same composite hash value as the current document has been analyzed. If not, the system can analyze the current document to determine one or more items of analytic metadata to be associated with the current document. If a previous document having the same composite hash value as the current document has been analyzed, the system can associate the current document with the analytic metadata items determined from analyzing the previous documents. A representation of the association between the one or more items of analytic metadata and the current document can be stored. The process can be repeated to analyze any number of documents.

Another aspect of the invention relates to computer systems. A computer system can include a storage subsystem configured to maintain a document information data store and a processor coupled to the storage subsystem. The processor being configured to perform one or more content-based analysis operations on documents in a corpus of documents and to store results of the analysis in the document information data store. The processor is also configured to compute a composite hash value for each of the documents, assign each document to a group of documents having the same composite hash value, perform the one or more content-based analysis operations on one document from each group, and store a result of the one or more content-based analysis operations in the document information data store in association with each of the documents in the group. As new documents are received, the processor can compute a composite hash value for the new document and either assign it to an existing group or analyze it, depending on whether the composite hash value for the new document matches an existing group.

The following detailed description together with the accompanying drawings will provide a better understanding of the nature and advantages of the present invention.

BRIEF DESCRIPTION OF THE DRAWINGS

FIGS. 6A and 6B illustrate document storage based on composite hash values according to an embodiment of the present invention. FIG. 6A shows a composite hash value for a document.

DETAILED DESCRIPTION

Certain embodiments of the present invention relate to techniques that can be used to reliably identify highly similar (including identical) documents, which are then treated as identical for purposes of document analysis. Identification of highly similar documents can be based on a composite hash value, a single scalar value representing content of the document and constructed in such a way that the likelihood of two documents having the same composite hash value is high if and only if the documents have a very high degree of similarity in their content (e.g., using the same words with the same frequency). Prior to performing content-based analysis, such as semantic clustering or language identification, on a current document, the composite hash value for the current document is determined and compared to composite hash values of previously analyzed documents. If a match is found, the results of the analysis of the previous document (which may include, e.g., analytic metadata such as a language or cluster identifier associated with the document) can be applied to the current document. If no match is found, the current document is analyzed.

System Overview

Figure 1:
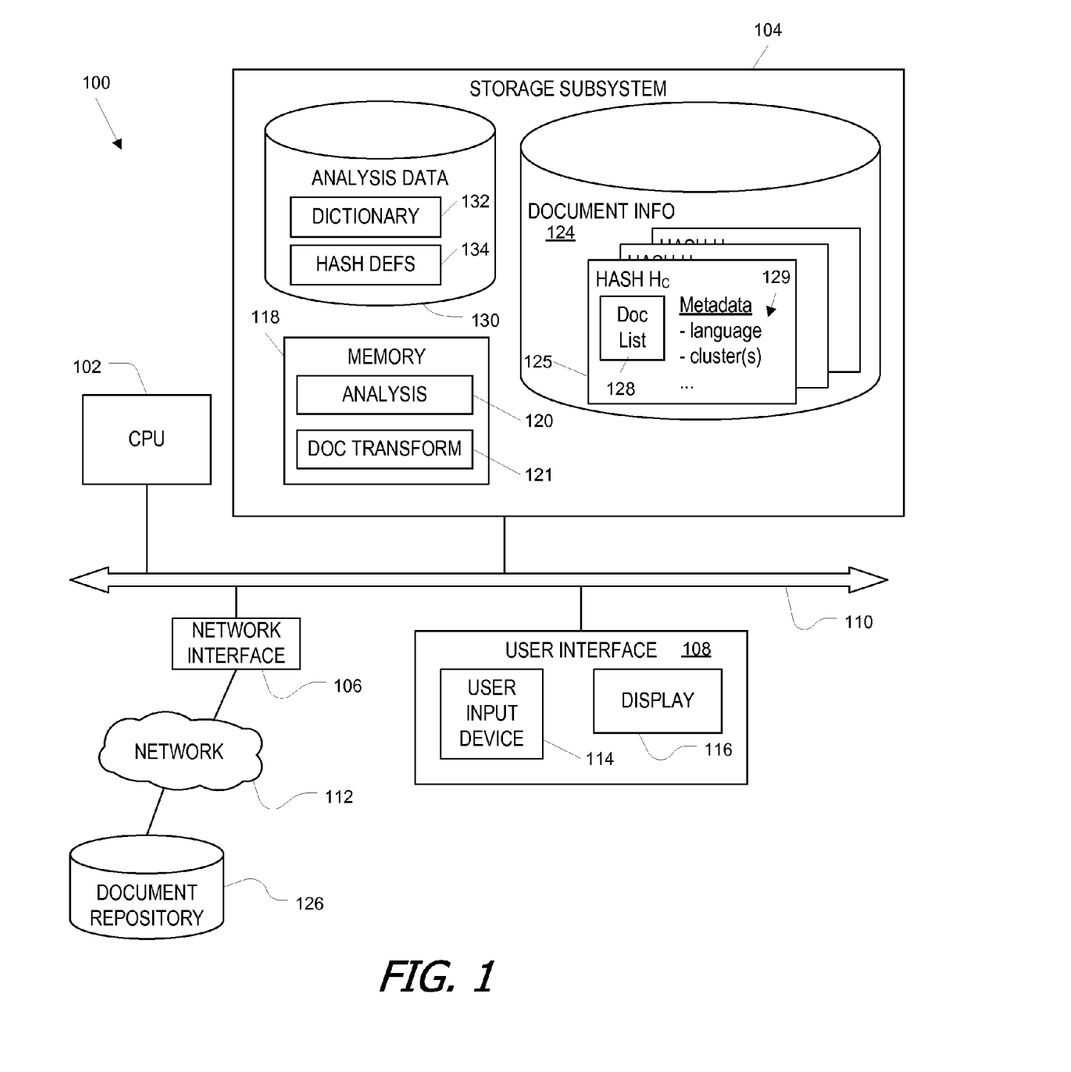
FIG. 1 is a block diagram of a computer system according to an embodiment of the present invention.

FIG. 1 is a block diagram of a computer system 100 according to an embodiment of the present invention. Computer system 100 includes a CPU 102, storage subsystem 104, network interface 106, and user interface 108 connected via a bus 110. CPU 102 can be, e.g., any programmable general-purpose processor. Network interface 106 provides access to one or more other computer systems via a network 112, which can include, e.g., a local area network (LAN), a wide area network (WAN), the Internet (a globally interconnected network of computer networks), a virtual private network, and so on. Network interface 106 can be implemented using standard protocols, including wired protocols (e.g., Ethernet) and/or wireless protocols (e.g., any IEEE 802.11 protocol). User interface 108 can include one or more input devices 114 such as a keyboard, mouse, touch screen, touch pad, etc., and one or more output devices such as a display 116. Bus 110 can be implemented using conventional bus architectures and may include bridges, bus controllers, and the like.

Storage subsystem 104 incorporates various computer-readable storage media to provide storage for programs and data accessed by CPU 102 and/or other components of computer system 100. In the embodiment shown, storage subsystem 104 includes primary memory 118. Primary memory 118 provides the fastest access times and can be implemented using known memory technologies such as DRAM (dynamic random access memory) and/or SRAM (static random access memory). Primary memory 118 is advantageously used at any given time to store programs and/or data that are actively in use by CPU 102. Thus, for example, memory 118 is shown as storing an analysis program 120 that, when executed, causes CPU 102 to perform various document analysis operations, such as language determination, clustering and/or categorizing documents, or the like. Memory 118 in this example also stores a document transformation program 121 that, when executed, causes CPU 102 to transform documents to a composite-hash representation (e.g., as described below) that can facilitate document analysis and data storage.

Storage subsystem 104 in this embodiment also provides various secondary storage areas, which can include, e.g., magnetic media such as conventional hard or floppy disks, optical media such as compact disc (CD), digital versatile disc (DVD), or the like, and/or semiconductor media such as flash memory. Secondary storage areas generally have longer access time than primary memory 118 but have larger storage capacity. In this example, secondary storage areas are provided for an analysis data store 130 and a document information data store 124.

Document information data store 124 provides information (also referred to as metadata) about a corpus of documents. As used herein, a "corpus" of documents can be any collection of documents about which information is to be provided to a user of system 100. In one embodiment, the corpus of documents (or a portion thereof) can be stored in a document repository 126 that is remote from computer system 100 and accessible via network interface 106 and network 112. In another embodiment, the corpus (or a portion thereof) can be stored locally, e.g., within storage subsystem 104. The corpus can be centralized or distributed (e.g., it can be a collection of World Wide Web documents that are stored on respective web servers connected to network 112 as is known in the art) as desired, and document information data store 124 might or might not contain actual documents.

Document information data store 124 in some embodiments is organized according to a composite hash ($H_c$)—a single value representative of document content that can be computed by CPU 102 executing document transformation program 121; examples of such computation are described below. Composite hash $H_c$ is advantageously defined such that documents with the same composite hash can be treated as highly similar to each other, making the composite hash convenient for indexing document-related metadata. In some embodiments, for each distinct value of composite hash $H_c$, document information data store 124 incorporates a data structure 125. Data structure 125 includes a document list 128, which lists each document having that value of composite hash $H_c$. Document list 128 can include a unique identifier ("DocID") for each document listed. The document identifier can include, e.g., a unique reference to a location where the document is stored or a coded identifier (e.g., an index) that can be used to determine where the document is stored (e.g., by reference to a lookup table), allowing the document to be retrieved by reference to its DocID. Also associated with each composite hash value can be one or more items of analytic metadata 129, such as the language of the documents in document list 128, identification of one or more document clusters or concepts to which the documents in document list 128 belong, identification of near-duplicate documents, and so on. In this embodiment, the same analytic metadata 129 is associated with every document in document list 128.

Document information data store 124 can also include any other information about the documents, such as dates of creation, editing, and/or addition to the corpus; type of document (e.g., e-mail, web page, word processor document); author; source or location from which the document was obtained; a condensed representation of document content in a readily searchable form; language information; keywords; categorization information; and so on. In some embodiments, document information data store 124 provides a relational database containing document information.

Analysis data store 130 in this embodiment provides data that can be referenced by programs executing on CPU 102, e.g., document transformation program 121 and/or analysis program 120. For example, analysis data store 130 can include a dictionary 132. As used herein, a "dictionary" can include any list of words (i.e., character strings) in any language or combination of languages, and the list can include any number of words. Dictionary 132 can be used to define a "word space" for purposes of characterizing a document, e.g., as described below. Analysis data store 130 can also provide a set of hash-component definitions 134 for use in defining a hash vector H. For instance, each hash component can be based on a different subset of the words in dictionary 132. As described below, dictionary 132 and hash component definitions 134 can be used in connection with document transformation program 121 to generate composite hash values H. Analysis data store 130 can also include other data such as cluster definitions or the like that may be used by analysis programs 120.

It will be appreciated that computer system 100 is illustrative and that variations and modifications are possible. For example, although storage subsystem 104 is shown as local to system 100, in alternative embodiments, all or part of storage subsystem 104 can be implemented as remote storage, e.g., on a storage area network (SAN) or other remote server accessible via network 112. Thus, for example, document information data store 124 and/or analysis data store 130 can be stored locally or remotely as desired. Further, although analysis program 120 and document transformation program 121 are shown as residing in primary memory 118, the invention is not limited to any particular mechanism for supplying program instructions for execution by CPU 102. For instance, at any given time some or all of the program instructions for analysis program 120 or document transformation program 121 may be present within CPU 120 (e.g., in an on-chip instruction cache and/or various buffers and registers), in a page file or memory mapped file on a system disk, and/or in other local or remote storage space. In some embodiments, computer system 100 might be implemented as a server accessible to a user via a network, and user interface 108 is optional. Computer system 100 may also include additional components such as floppy disk drives, optical media drives (e.g., CD or DVD), network interface components, USB interface, and the like. Computer system 100 can be configured with many different hardware components and can be made in many dimensions and styles (e.g., laptop, tablet, server, workstation, mainframe); network connections may be provided via any suitable transport media (e.g., wired, optical, and/or wireless media) and any suitable communication protocol (e.g., TCP/IP). A particular computer architecture or platform is not critical to the present invention.

Computing a Composite Hash

Figure 2:
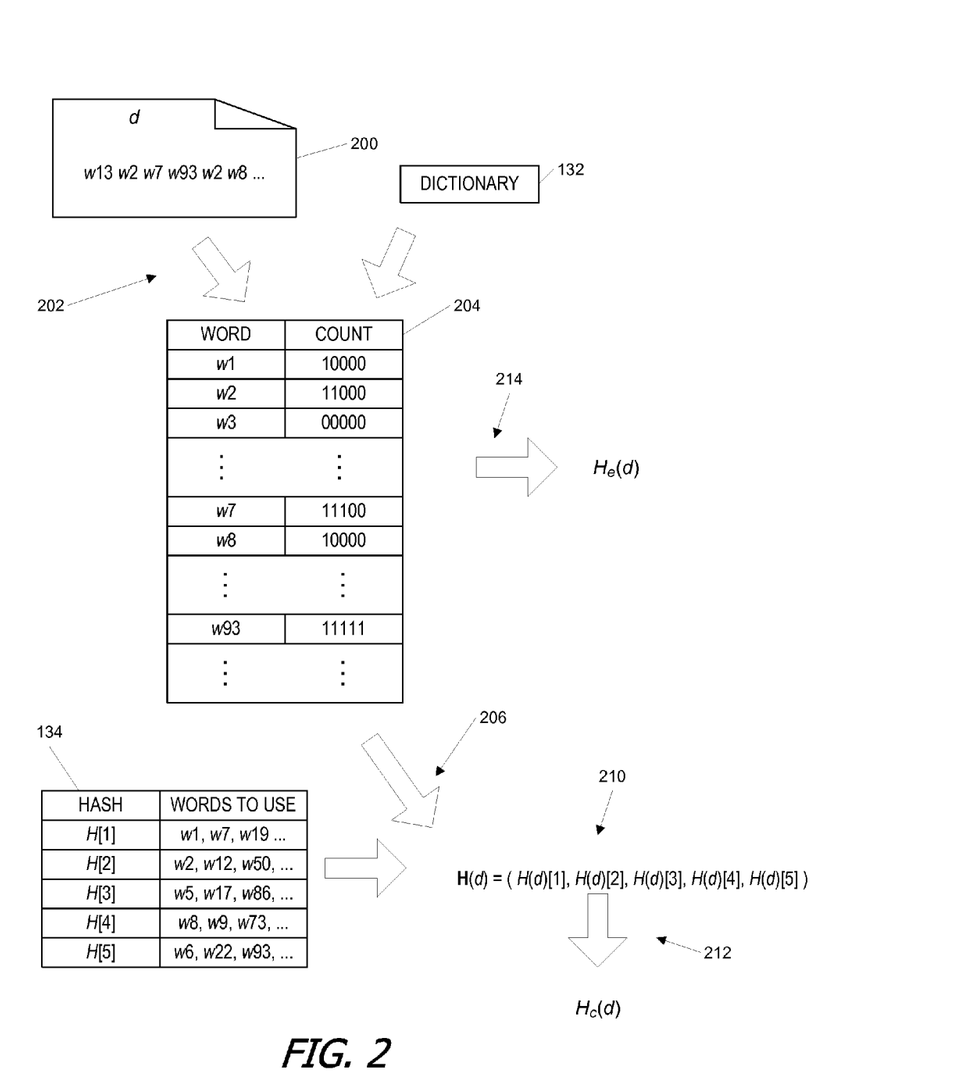
FIG. 2 illustrates a transformation of a document to a vector representation usable in certain embodiments of the present invention to compute a composite hash value for the document.

To facilitate computation of composite hashes, some embodiments of the present invention use a vector representation of documents. FIG. 2 illustrates a transformation of a document 200 to a vector representation usable in certain embodiments of the present invention to compute a composite hash value for the document. Such a transformation can be implemented, e.g., as program code in document transformation program 121.

A document (d) 200 as shown contains a series of words. As used herein, a "word" in a document is a sequence of consecutive characters. Words may be delimited by a word-separation character such as a space character or punctuation mark, by a selected maximum length, or by other techniques for segmenting a document into words. In this embodiment, document 200 includes words w13, w2, w7, etc., which are words from dictionary 132 of FIG. 1. In some embodiments, phrases may also be identified as "words." Existing techniques for phrase identification can be used, as can techniques described in co-pending U.S. Patent Application No. 61/300,385, the disclosure of which is incorporated herein by reference in its entirety for all purposes.

A first transformation 202 converts document 200 to a count vector 204 in a high-dimensional "word space" in which the coordinate axes (or dimensions) correspond to the different words (or phrases) w1, w2, etc. that are in dictionary 132. Dictionary 132 can have any number of words (e.g., several thousand or tens of thousands or even hundreds of thousands), and accordingly count vector 204 is generally a high-dimensional vector. Transformation 202 determines each component of count vector 204 by counting occurrences within document 200 of each word in dictionary 132. The particular content and number of words in dictionary 132 can be varied as desired. In some embodiments, dictionary 132 may treat words derived from the same stem as a single word so that, for instance, "patent," "patented," "patents," and "patentable" could all be regarded as the same word; in other embodiments, different words formed from the same stem can be treated as different words. Existing word-counting algorithms can be applied for this purpose, and a detailed description is omitted.

In the embodiment of count vector 204 of FIG. 2, the count of occurrences of each word is represented in a unary format. For example, the count for each word can be a fixed-length bit field, and one bit can be set for each occurrence of the word up to a maximum number. Thus, in vector 204, a count of 10000 represents one occurrence, 11000 represents two occurrences, etc. While a five-bit unary representation is used here for simplicity, a larger representation (e.g., 50 bits) can be more informative for large documents. In addition, binary or other formats can also be used to represent the word counts.

It will be appreciated that if transformation 202 is applied to two documents, the degree of difference between the two documents can be measured by determining the number of bits that are different between their count vectors. Thus, presence or absence of high similarity between two documents could in principle be determined by reference to the number of differences between their count vectors. This pairwise comparison technique, however, is not well suited for a large corpus of documents. Further, large amounts of storage may be required for the count vectors 204, as the vectors may be quite large. In addition, depending on the content of dictionary 132, count vectors 204 may be only sparsely populated, as a given document will generally use only a tiny fraction of the words in a dictionary.

Some embodiments of the present invention provide a more efficient representation in which word-count vector 204 is further transformed to a lower-dimensional space by transformation 206, which uses hash definition table 134. Specifically, transformation 206 computes a number of "hash components" (e.g., H(d)[1], H(d)[2] etc.) from count vector 204 to produce a hash vector (H(d)) 210. As shown in hash definition table 134, each hash component is based on a different subset of the words in dictionary 132 (the "words to use"). For a given hash component (e.g., H[1]), the counts from word vector 204 that correspond to the words associated with that hash component (e.g., words w1, w7, w19, etc. for hash component H[1]) are concatenated, and a hash function, which may be of a conventional type, is applied to the concatenation.

An arbitrary number (N) of hash components can be computed in transformation 206. In the embodiment shown, N=5, although other numbers can be used. Each hash component can involve applying the same hash function to the counts for a different subset of the words, or different hash functions can be used to generate different hash components. The subsets of words used for the different hash components are advantageously different. In some embodiments, the same word can be used for multiple hash components (the subsets can be but need not be disjoint), and there is no requirement that the hash components, taken together, incorporate all the words from dictionary 132. Those skilled in the art will recognize that counting in transformation 202 can be limited to those words from dictionary 132 that are included in at least one of the hash components of table 134.

It should be noted that the number of hash components in hash vector 210 is advantageously much smaller (e.g., several orders of magnitude smaller) than the number of words in dictionary 132 or the number of dimensions in count vector 204. To the extent that the hash components H(d)[i] (where i=1, . . . , N) are orthogonal—i.e., do not include any of the same words—hash vector 210 can be regarded as a projection of count vector 204 into an N-dimensional space, where N is lower than the dimensionality of the word space. The similarity of hash vectors for different documents can be used as an approximation of the similarity of their count vectors. There will in general be some false positives (i.e., non-similar documents with similar vectors) due to the loss of information in projecting into a lower-dimensional space; however, for even a relatively small N (e.g., N=5), it has been found that the rate of false positives can be kept acceptably low.

In some embodiments, hash vector H(d) can be further transformed by transformation 212 to a composite hash $H_c(d)$, a single scalar value representing the document content. Transformation 212 can be, for example, a hash function applied to the concatenated components of hash vector H(d).

In some embodiments, an "exact" hash value $H_e(d)$ is computed in addition to the composite hash value $H_c(d)$, as indicated by transformation 214. $H_e(d)$ can be, for example, a hash over all bits of count vector 204. Exact hash value $H_e(d)$ has the property that only identical documents are likely to have the same exact hash value; similar but not identical documents will typically have different $H_e(d)$ values. In general, two documents with identical exact hashes $H_e(d)$ values will also have identical composite hashes $H_c(d)$; thus, identical documents would also be identified as "very similar" or "highly similar" based on comparing $H_c(d)$ values.

It will be appreciated that the transformations shown in FIG. 2 are illustrative and that variations and modifications are possible. The dictionary used to define the word-space and the number of words included may be varied without restriction. The hash vector can include any number of components and each component can be based on any subset of words selected from the dictionary. Selection can be made in a variety of ways, e.g., random assignment of words to different subsets. It is not required that every possible word be associated with a component of the hash vector, nor is assigning the same word to multiple components excluded. Further, as described below, other projection techniques can be used to reduce a document representation from word space to an N-dimensional space, and the present invention is not limited to hash vectors.

The reduction in size and storage requirements achieved using hash vectors can be considerable. For example, in one embodiment, a dictionary can include about 100,000 words, and 25 bits per word can be used to represent the occurrence count. In this the case the bit vector describing each document would be 2.5 million bits, and it would be very expensive to calculate and compare bit vectors of this size. Using the hash vector can reduce the 100,000 vector components to a small number (e.g., 5 or 7) of hash values, which provides considerable compression, and further reduction can be achieved using the composite hash values.

The dimensionality of the hash vector H (i.e., the number N of hash-vector components) can be selected as a matter of design choice. Multiple hash-vector components are desirable, in part because hash functions are non-local, meaning that similar (though not identical) inputs do not necessarily produce similar outputs. Thus, comparing a single hash-vector component between two documents can indicate whether the documents are alike or not in relation to the characteristics represented in that component, but if the component is not the same, the difference does not correlate with a degree of dissimilarity. Comparing multiple hash-vector components provides additional information because documents that have a high degree of similarity will have hash vectors that are alike in most or all of their components, with relatively few differences.

Accordingly, increasing the number N of hash-vector components used can provide more information about the documents, thereby reducing the rate of false positives (i.e., documents identified as similar that are in fact not very similar). On the other hand, increasing the number N of hash-vector components generally increases the computation time, both in generating the hash vectors and in comparing them; it also increases the amount of storage required to store the hash vectors for each document. It has been found that N=5 provides a good tradeoff between processing resource requirements and quality of the results; however, the present invention is not limited to any particular dimensionality.

Document Analysis Using Composite Hash Values

The composite hash $H_c$ reduces document comparison to comparison of a single scalar value. In some embodiments, composite hash $H_c$ is used to identify documents that are highly similar: any two or more documents with the same composite hash value are identified as being highly similar to each other.

Further, because matching composite hash values are indicative of high similarity, documents identified as being highly similar can be treated as identical for purposes of many analysis tasks that may be done when attempting to categorize a large corpus of documents. For example, automated techniques for determining the language (or in some cases languages) of a document have been developed (see, e.g., commonly-assigned co-pending U.S. patent application Ser. No. 12/274,182, filed Nov. 19, 2008). Documents that are similar enough to have the same composite hash value will nearly always be in the same language; thus, a language determined by analyzing one of the documents can be assigned to all others without actually analyzing every document.

As another example, documents can be clustered or categorized based on topic (referred to herein as "semantic clustering"). Documents that are similar enough to have the same composite hash value will nearly always be directed to the same topic (or topics); accordingly, one document from a group with a given composite hash value can be categorized, and that categorization can be assigned to all others in the group without actually analyzing every document. Similarly, documents with the same composite hash value can also be regarded as near-duplicates of each other for purposes of near-duplicate clustering.

A similar principle applies to any form of content-based document analysis: if a group of two or more documents are similar enough to have the same composite hash value, then it is very likely that the content of any one of them is representative of all documents in the group. This principle can be used to speed analysis of a document corpus: as each document is processed, its composite hash value is determined. If the value matches that of a previously processed document, any and all properties assigned during content-based analysis of the previous document can be assigned to the current document without having to repeat the analysis. Examples of such content-based document analysis include determining the language, conceptual classification, identification of similar or near duplicate documents, etc. Other examples include identifying "garbage" documents (i.e., documents unlikely to contain useful information), type of document, and so on.

In still another example, composite hash values can be used in a system for identifying and sequestering undesirable documents or communications (such as unsolicited bulk e-mail or other junk e-mail, commonly referred to as "spam"): a document that has the same composite hash value as a known example of spam is very likely also spam.

In addition to improving processing time, assigning properties to a document based on its composite hash value can also improve the consistency with which similar documents are treated. By way of illustration, consider an electronic document discovery project in which documents may be received over a period of weeks or months. As more documents are received, some aspects of document analysis may change; for example, in the case of semantic clustering, a cluster may be defined on the basis of average properties of documents in the cluster. As new documents are added, the composition of various clusters changes, causing the averages to drift. A document that might have been associated with a given cluster (cluster X) if it had been received and processed at a first time might end up not associated with cluster X if received and processed weeks later, after numerous other documents. If documents with matching composite hash values are always assigned to the same clusters, and if a particular document is assigned to cluster X, any subsequent document with the same composite hash value would also be assigned to cluster X, regardless of when it is received relative to other documents. Thus, highly similar documents can be expected to be in the same cluster(s). Similarly, consistent treatment of highly similar documents can be expected with respect to any attribute that can be determined by content-based document analysis.

Figure 3:
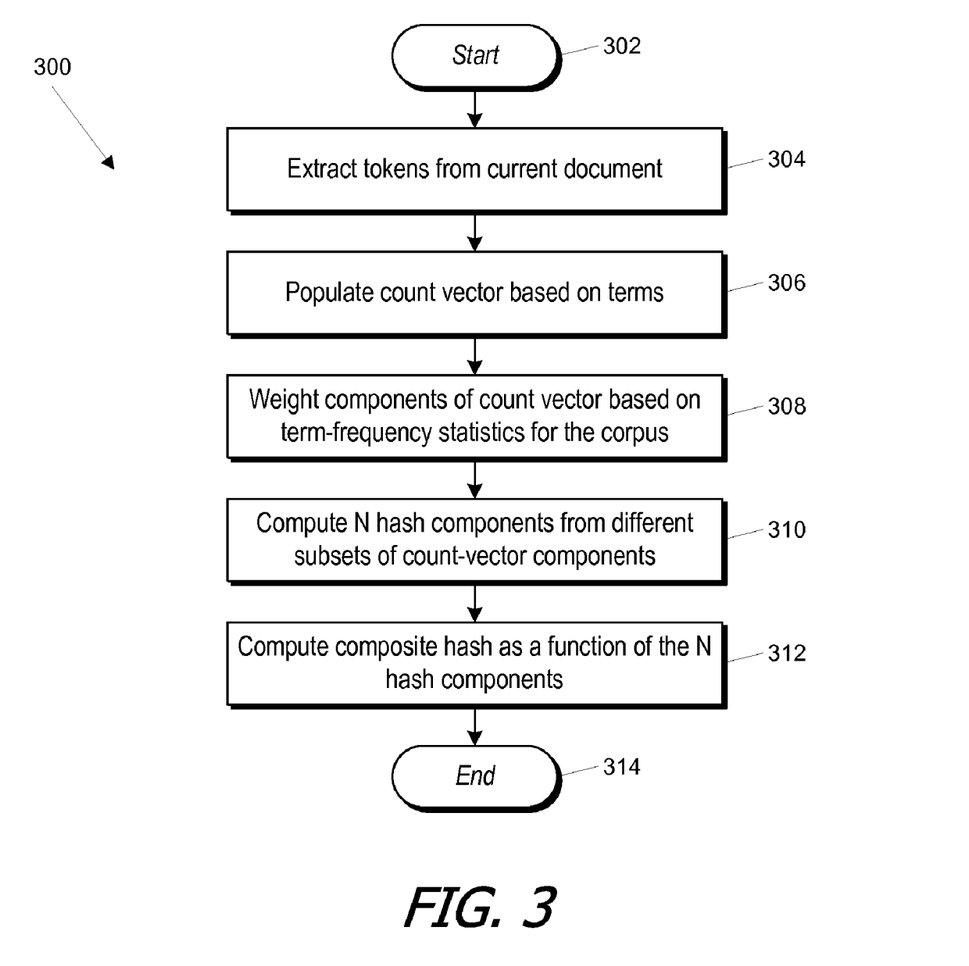
FIG. 3 is a flow diagram of a process for computing a composite hash value for a document according to an embodiment of the present invention.

FIG. 3 is a flow diagram of a process 300 for computing a composite hash value for a document according to an embodiment of the present invention. Process 300 starts (block 302) when a document to be analyzed is received. At block 304, content tokens are extracted from the document; existing techniques may be used. At block 306 a count vector (e.g., count vector 204 of FIG. 2) is populated based on the extracted tokens, such that the value of each component reflects the number of occurrences of a term (single word or phrase) associated with that component.

At block 308, each component of the count vector can be weighted based on the significance of the term associated with that component. In some embodiments, weights are chosen such that uncommon words receive higher weight; for example, the weight for a term can be the reciprocal of the logarithm of the number of documents in the corpus that contain the term. In other embodiments, all terms can receive the same weight.

At block 310, a number N of hash components are computed from the weighted count vector. In one embodiment, each component of the weighted count vector is rounded off to the nearest integer, and the resulting vector is converted to a unary representation as described above with reference to FIG. 2. N different (preferably but not necessarily disjoint) subsets of the bits of the unary vector are selected, and a hash function is computed for each subset. Conventional hashing algorithms can be used.

At block 312, a composite hash value $H_c$ is computed from the N hash components. Again, conventional hashing algorithms can be used.

It will be appreciated that process 300 is illustrative and that variations and modifications are possible. Steps described as sequential may be executed in parallel, order of steps may be varied, and steps may be modified, combined, added or omitted. For instance, in some embodiments, block 310 can be omitted, and a composite hash value $H_c$ can be computed by selecting a large fraction of the bits in the unary-vector representation of the document. Various hashing algorithms can be used to compute hash components and the composite hash.

Figure 4:
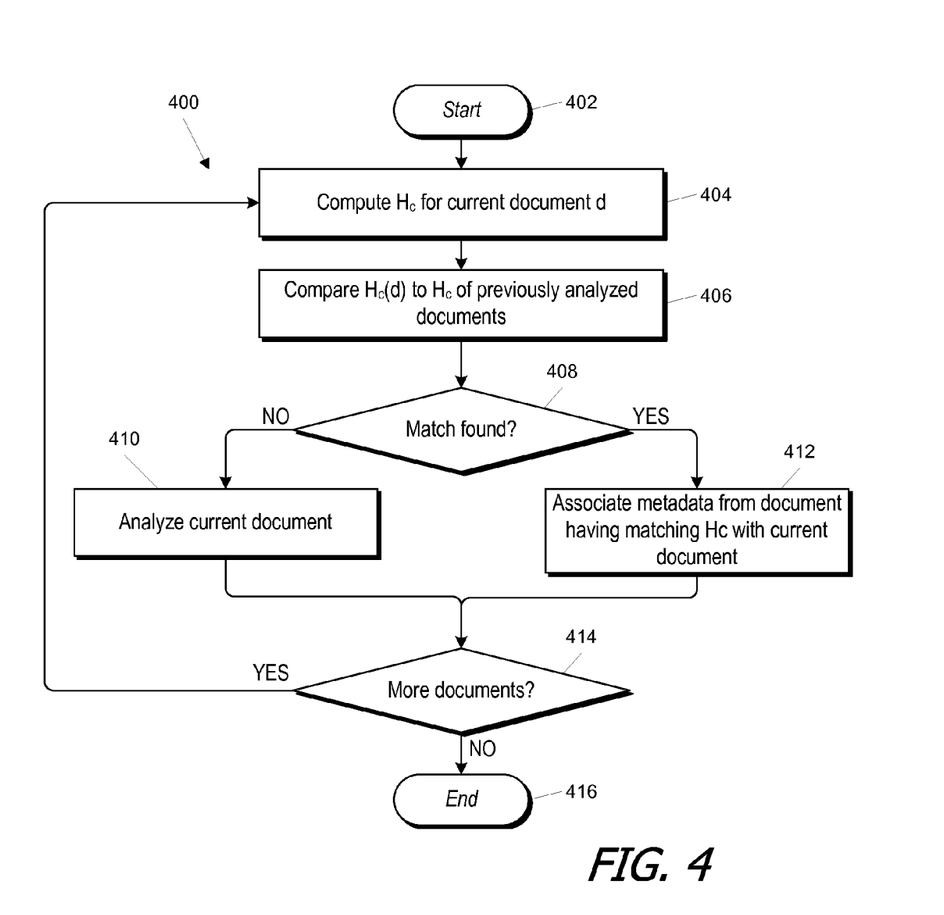
FIG. 4 is a flow chart of a process for analyzing documents according to an embodiment of the present invention.

Once determined, the composite hash can be used to facilitate analysis. For example, FIG. 4 is a flow chart of a process 400 for analyzing documents according to an embodiment of the present invention. Process 400 starts (block 402) with a first document d to be analyzed. At block 404, a composite hash value $H_c(d)$ is computed, e.g., using process 300 described above. At block 406, $H_c(d)$ is compared to the composite hash of each previously analyzed document. If (block 408) no match is found, then at block 410 the document can be analyzed to determine various analytic metadata associated with the document. Any type of content-based analysis can be included at block 410, such as language identification, detection of near-duplicate documents (using looser criteria than an exact match of composite hashes, e.g., as described in above-referenced U.S. Provisional Application No. 61/250,135), and semantic clustering/categorization. The content-based analysis produces analytic metadata (e.g., a list of clusters to which the document belongs, a language associated with the document), and the analysis can include storing the produced metadata in association with the document identifier.

In some embodiments, the analytic metadata can be stored in association with the composite hash value $H_c(d)$, and the document identifier of document d can also be associated with its composite hash value, e.g., as illustrated in FIG. 1. As described below, this organization can facilitate subsequent operations such as responding to user queries.

If, at block 408, it is determined that $H_c(d)$ matches the composite hash of a previously analyzed document, then at block 412, the analytic metadata associated with the previously analyzed document can be further associated with the current document d. For example, in the embodiment shown in FIG. 1, the document identifier for document d can simply be added to the document list 128 associated with the composite hash value $H_c(d)$. In this embodiment, a document whose composite hash value matches that of a previously analyzed document is not analyzed separately; it inherits the analytic metadata of the previously analyzed document.

At block 414, it is determined whether more documents remain to be processed. If so, process 400 returns to block 404 to compute a composite hash value for the next document. If not, process 400 ends (block 416).

It will be appreciated that process 400 is illustrative and that variations and modifications are possible. Steps described as sequential may be executed in parallel, order of steps may be varied, and steps may be modified, combined, added or omitted. In some embodiments, all documents are first processed to determine a composite hash value, followed by analysis of one document for each composite hash value. The document to be analyzed can be selected at random or in some other manner.

Figure 5:
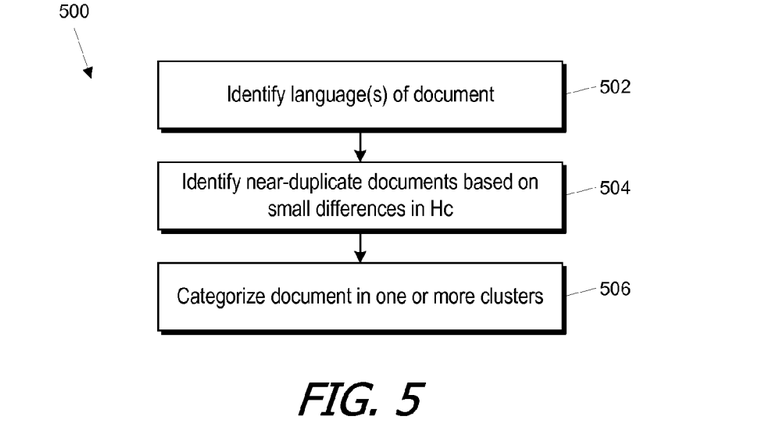
FIG. 5 is a flow diagram of an analysis process that can be performed for a document according to an embodiment of the present invention.

Any type of content-based analysis can be simplified using process 400. By way of example, FIG. 5 is a flow diagram of an analysis process 500 that can be performed for a document (e.g., at block 410 of FIG. 4) according to an embodiment of the present invention.

At block 502, language identification is performed. Automated language identification techniques can be used, e.g., as described in above-referenced U.S. patent application Ser. No. 12/274,182.

At block 504, "near-duplicate" documents can be identified based on detecting small differences in the hash vectors H (e.g., as described above with reference to FIG. 2) between documents with different composite hash values $H_c$. Examples of techniques that can be used for near-duplicate identification are described in above-referenced U.S. Patent Application No. 61/250,135. In some embodiments, documents that are near duplicates of each other are not treated as the same for purposes of other types of analysis; analytic metadata is only shared between documents with identical composite hash values $H_c$, which usually will be documents with identical hash vectors H.

At block 506, the documents can be assigned to one or more semantic clusters. Known clustering and categorization algorithms, including but not limited to algorithms described in U.S. Pat. Nos. 7,469,246 and 7,308,451, can be used; other semantic clustering or categorization algorithms can also be used.

It will be appreciated that specific analyses and order of analysis shown in FIG. 5 is illustrative. In some embodiments, different analyses can be performed in parallel, and more or fewer analytic processes may be applied to a document. As described above, process 500 can be performed at block 410 of FIG. 4; that is, analysis is performed for documents whose composite hash values do not match that of any document previously analyzed. To the extent that multiple documents are highly similar (have matching composite hash values), the number of documents to be analyzed in process 500 can be reduced, speeding processing time.

Document and Data Storage Using Composite Hash

Figure 6A:
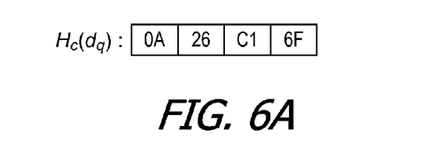
Figure 6B:
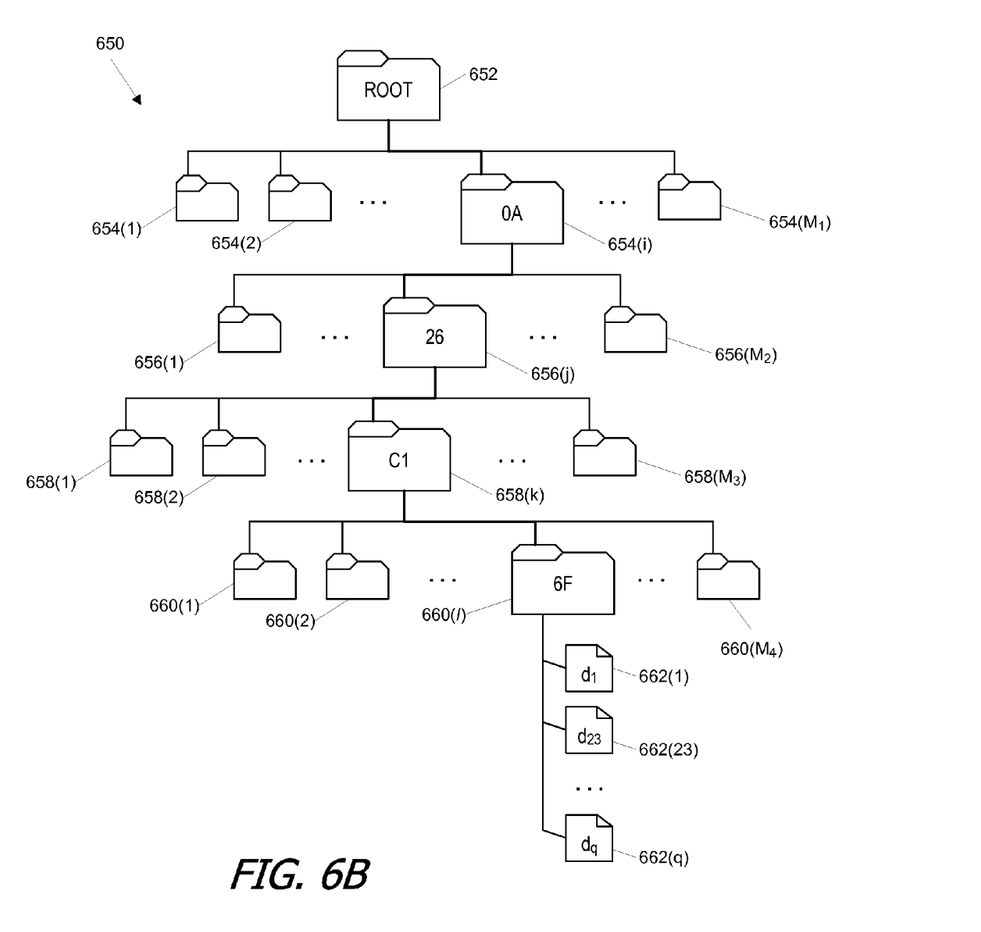
FIG. 6B illustrates a folder tree for storing documents (including the document of FIG. 6A) based on a composite hash value.

In some embodiments, the composite hash values can be used to manage document storage and/or database access in an efficient manner. An example for document storage is illustrated in FIGS. 6A and 6B. FIG. 6A shows a composite hash value $H_c(d_q)$ for a document $d_q$. In this example, the composite hash value is a four-byte number represented in hexadecimal notation. It is to be understood that hash values can have more or fewer bits.

FIG. 6B illustrates a folder tree 650 for storing documents that can be implemented, e.g., in storage subsystem 104 of FIG. 1 (if documents are stored locally) according to an embodiment of the present invention. Folder tree 650 has a "root" folder 652. It is to be understood that this folder can be but need not be the root folder of a filesystem in which folder tree 650 resides. Within root folder 652 are subfolders 654(1)-654($M_1$), one subfolder for each extant (or in some embodiments each possible) value of the first byte of a composite hash value. Folder 654(*i*) corresponds to byte value 0A (in hexadecimal), the first byte of the composite hash value in FIG. 6A.

At the second level, folder 654(*i*) can have subfolders 656(1)-656($M_2$); again, a subfolder can be provided for each extant (or possible) value of the second byte of a composite hash. Folder 656(*j*) corresponds to byte value 26 (in hexadecimal), the second byte of the composite hash value in FIG. 6A. Although not shown in FIG. 6B, other folders 654 can also have subfolders associated with possible second-byte values.

At the third level, folder 656(*j*) can have subfolders 658(1)-658($M_3$); again, a subfolder can be provided for each extant (or possible) value of the third byte of a composite hash. Folder 658(*k*) corresponds to byte value C1 (in hexadecimal), the third byte of the composite hash value in FIG. 6A. Similarly, other folders 656 can have subfolders associated with possible third-byte values.

At the fourth level, folder 658(*k*) can have subfolders 660(1)-660($M_4$); again, a subfolder can be provided for each extant (or possible) value of the fourth byte of a composite hash. Folder 660(*l*) corresponds to byte value 6F (in hexadecimal), the fourth and last byte of the composite hash value in FIG. 6A. Other folders 658 can also have subfolders associated with possible fourth-byte values.

Within folder 660(*l*) are all documents 662 whose composite hash is as given in FIG. 6A. Thus, document $d_q$ can be stored in folder 660(*l*), along with any other documents (such as documents $d_1$ and $d_{23}$ in this example) that have the same composite hash value. In some embodiments, a reference to a location where document $d_q$ is stored, rather than document $d_q$ itself, may be stored within folder 660(*l*).

It will be appreciated that folder tree 650 is illustrative and that variations and modifications are possible. Instead of being organized by bytes (8 bits), a folder tree can be organized using other units, e.g., 4 bits, 16 bits, or 32 bits. The composite hash value can include any number of bits, and the folder tree can vary in the number of levels based on the number of bits and how the bits are broken out into different levels.

A similar technique can be used to organize a database of the analytic metadata for each document. Thus, for example, a table indexed by composite hash value can store the analytic metadata associated with all documents having a particular composite hash value as well as a list (or link to a list) of identifiers of documents having that composite hash value. If a mapping from document identifier to composite hash value is provided, a query for analytic properties of a particular document can be answered by using the composite hash value for that document to retrieve analytic metadata from the table.

It should be noted that not all possible metadata for a document is advantageously stored once per composite hash value. In addition to the analytic metadata described above (i.e., metadata generated through some form of content-based document analysis), a document may also have other associated metadata such as creation date, modification date, author or source identifier, etc. Such metadata is advantageously stored on a per-document basis, as different documents with the same or very similar content may well have different creation dates, sources, etc.

Further Embodiments

While the invention has been described with respect to specific embodiments, one skilled in the art will recognize that numerous modifications are possible. For instance, as noted, the computation of a composite hash value for a document can be varied, e.g., in the dimensionality of hash vectors, the definition of each hash component, and so on. The particular content of the dictionary used to define the word space and the assignment of dictionary words to hash components can be varied as desired. As noted above, in some embodiments, the assignment is random, but non-random assignments can also be used.

Embodiments described above make reference to transforming a document to a hash vector consisting of N hash components, where each hash component is defined as a hash function on some set of words that might or might not occur in the document. In some embodiments, the hash components are orthogonal (e.g., based on disjoint subsets of the dictionary words); however, this is not required. Further, the invention is not limited to hash functions or hash vectors. For example, functions other than hash functions can be defined that are based on the counts of various words, and any such functions over a large fraction of the term space can be used to compute a value representing the document content, provided the occurrence of identical function values between two documents serves as a reliable indicator of a high degree of similarity of the documents.

As noted above, determining whether two documents have a high degree of similarity (e.g., based on the occurrence of identical composite hash values) can be used to speed up document analysis by analyzing only one document from each group of highly similar documents. In an embodiment described above, document analysis proceeds sequentially, and the first document encountered that has a particular composite hash value is analyzed as representative of the group. In other embodiments, the computation of composite hashes for all documents and grouping of documents with identical composite hashes can precede other content-based analysis, and for each group of documents with identical composite hashes, any document can be arbitrarily selected as representing the group for purposes of content-based analysis such as semantic clustering, language identification, or near-duplicate clustering.

Further, while semantic clustering, language identification, and near-duplicate clustering have been specifically mentioned herein as examples of content-based analysis operations that can be performed on documents, those skilled in the art will recognize that other content-based analysis can also be performed; any such analysis can be accelerated by automatically applying the results of analyzing one document to a group of highly similar documents.

As described above, embodiments of the present invention may be implemented as computer programs. Such programs may be encoded on various computer readable media for storage and/or transmission; suitable media include magnetic disk or tape, optical storage media such as compact disc (CD) or DVD (digital versatile disc), flash memory, and the like. Computer readable media encoded with the program code may be packaged with a device (e.g., microprocessor) capable of executing the program or provided separately from such devices.

In addition, while the embodiments described above may make reference to specific hardware and software components, those skilled in the art will appreciate that different combinations of hardware and/or software components may also be used and that particular operations described as being implemented in hardware might also be implemented in software or vice versa.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Thus, although the invention has been described with respect to specific embodiments, it will be appreciated that the invention is intended to cover all modifications and equivalents within the scope of the following claims.

What is claimed is:

1. A method of analyzing documents belonging to a corpus, the method comprising:
   computing a composite hash value for a current document from the corpus;
   determining whether a previous document having the same composite hash value as the current document has been analyzed;
   in the event that a previous document having the same composite hash value as the current document has not been analyzed, analyzing the current document, wherein analyzing the current document includes determining one or more items of analytic metadata to be associated with the current document; in the event that a previous document having the same composite hash value as the current document has been analyzed, associating the current document with one or more items of analytic metadata determined from analyzing the previous document; and
   storing a representation of the association between the one or more items of analytic metadata and the current document.

2. The method of claim 1 wherein computing the composite hash value for the current document includes:
   transforming the current document to a content vector having a plurality of components;
   for each of a number N of subsets of the components of the content vector, computing a hash vector component by applying a hash function to that subset of the components of the content vector; and
   applying a hash function to the N hash vector components.

3. The method of claim 2 wherein transforming the document to a content vector includes creating a count vector indicating a number of occurrences within the current document of each of a plurality of terms.

4. The method of claim 3 wherein transforming the document to a content vector further includes weighting each term of the count vector based on term frequency statistics determined from a plurality of documents in the corpus.

5. The method of claim 1 wherein analyzing the current document includes performing at least one of the following operations:
   determining a language of the current document;
   determining whether any other document is a near duplicate of the current document; or
   categorizing the document as belonging to one or more of a plurality of semantic clusters.

6. The method of claim 1 wherein the composite hash value is represented as a plurality of groups of digits, the method further comprising:
   defining a folder hierarchy comprising a plurality of folders arranged in a plurality of levels, each level corresponding to a different one of the groups of digits, wherein the folders within each level correspond to different values for the one of the groups of digits;
   selecting a folder from the folder hierarchy based on the composite hash value of the current document; and
   storing the current document in the selected folder.

7. The method of claim 1 wherein the composite hash value is represented as a plurality of groups of digits, the method further comprising:
   defining a folder hierarchy comprising a plurality of folders arranged in a plurality of levels, each level corresponding to a different one of the groups of digits, wherein the folders within each level correspond to different values for the one of the groups of digits;
   selecting a folder from the folder hierarchy based on the composite hash value of the current document; and
   storing a reference to a location of the current document in the selected folder.

8. A computer-readable storage medium containing program instructions that, when executed by a computer system, cause the computer system to execute a method of analyzing a plurality of documents in a corpus of documents, the method comprising:
   selecting a current document from the corpus;
   computing a composite hash value for the current document;
   determining whether a previous document having the same composite hash value as the current document has been analyzed;
   in the event that a previous document having the same composite hash value as the current document has not been analyzed, analyzing the current document, wherein analyzing the current document includes determining one or more items of analytic metadata to be associated with the current document;
   in the event that a previous document having the same composite hash value as the current document has been analyzed, associating the current document with one or more items of analytic metadata determined from analyzing the previous document;
   storing a representation of the association between the one or more items of analytic metadata and the current document; and
   repeating the acts of selecting, computing, determining, either analyzing or associating, and storing until all of the plurality of documents have been analyzed.

9. The computer-readable storage medium of claim 8 wherein the method further comprises:
   transforming the current document to a content vector having a plurality of components;
   for each of a number N of subsets of the components of the content vector, computing a hash vector component by applying a hash function to that subset of the components of the content vector; and
   applying a hash function to the N hash vector components.

10. The computer-readable storage medium of claim 9 wherein transforming the document to a content vector includes creating a count vector indicating a number of occurrences within the current document of each of a plurality of terms.

11. The computer-readable storage medium of claim 10 wherein transforming the document to a content vector further includes weighting each term of the count vector based on term frequency statistics determined from a plurality of documents in the corpus.

12. The computer-readable storage medium of claim 8 wherein analyzing the current document includes performing at least one of the following operations:
   determining a language of the current document;
   determining whether any other document is a near duplicate of the current document; or
   categorizing the document as belonging to one or more of a plurality of semantic clusters.

13. A computer system comprising:
a storage subsystem configured to maintain a document information data store; and
a processor coupled to the storage subsystem, the processor being configured to perform one or more content-based analysis operations on documents in a corpus of documents and to store results of the analysis in the document information data store,
wherein the processor is further configured to:
compute a composite hash value for each of the documents;
assign each document to one of a plurality of groups, wherein all documents in a same group have a same composite hash value;
perform the one or more content-based analysis operations on one document from each of the plurality of groups; and
store a result of the one or more content-based analysis operations in the document information data store in association with each of the documents in the group.

14. The computer system of claim 13 wherein the processor is further configured to compute the composite hash value for each document by:
generating a content vector for the document, the content vector having a plurality of components;
for each of a number N of subsets of the components of the content vector, computing a hash vector component by applying a hash function to that subset of the components of the content vector; and applying a hash function to the N hash vector components.

15. The computer system of claim 14 wherein generating the content vector includes creating a count vector indicating a number of occurrences within the document of each of a plurality of terms.

16. The computer system of claim 15 wherein transforming the document to a content vector further includes weighting each term of the count vector based on term frequency statistics determined from a plurality of documents in the corpus.

17. The computer system of claim 13 wherein the one or more content-based analysis operations include at least one of the following operations:
a language-determining operation;
a near-duplicate detection operation; or
a semantic clustering operation.

18. The computer system of claim 13 wherein the composite hash value is represented as a plurality of groups of digits and wherein the storage subsystem is configured to store the plurality of documents in a folder hierarchy comprising a plurality of folders arranged in a plurality of levels, each level corresponding to a different one of the groups of digits, wherein the folders within each level correspond to different values for the one of the groups of digits.

19. The computer system of claim 13 wherein the composite hash value is represented as a plurality of groups of digits and wherein the document information data store is configured as a hierarchical data structure comprising a plurality of levels, each level corresponding to a different one of the groups of digits.

20. The computer system of claim 13 wherein the processor is further configured to receive new documents to be added to the corpus, wherein when a new document is received, the processor is configured to:
compute a composite hash value for the new document;
determine whether the composite hash value for the new document matches a composite hash value associated with one of the groups of documents;
add the new document to the one of the groups of documents in the event that the composite hash value matches the composite hash value associated with the one of the groups of documents; and
perform the content-based analysis operation on the new document in the event that the composite hash value does not match the composite hash value associated with any of the groups of documents.

\* \* \* \* \*